Jan. 13, 1970
G. L. HERVERT
3,489,818
TEMPERATURE CONTROL OF ALKYLATION REACTIONS
Filed Dec. 27, 1968
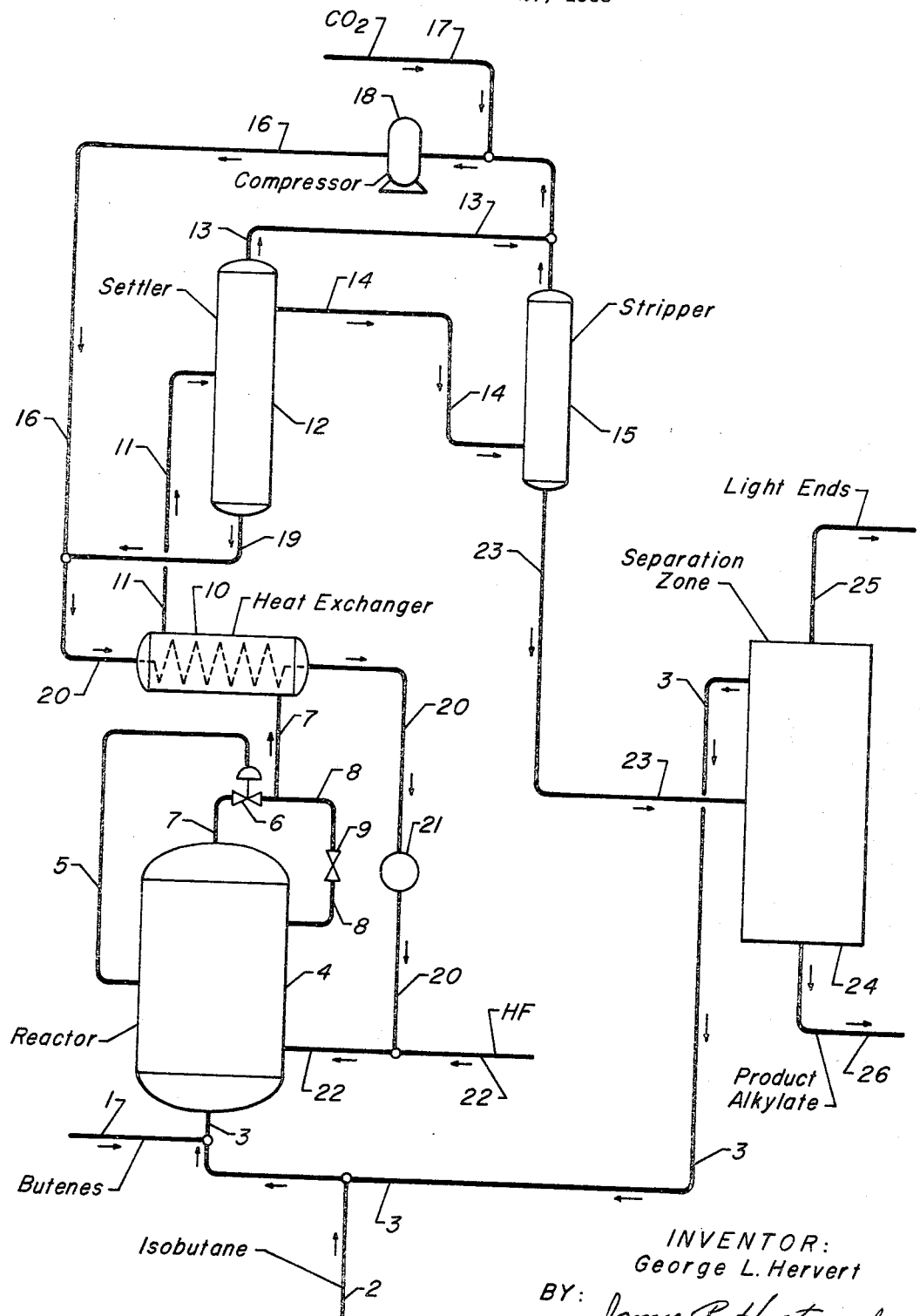
INVENTOR:
George L. Hervert
BY: James R. Hoatson Jr.
Robert W. Erickson
ATTORNEYS

United States Patent Office 3,489,818
Patented Jan. 13, 1970

3,489,818
TEMPERATURE CONTROL OF ALKYLATION REACTIONS
George L. Hervert, Downers Grove, Ill., assignor to Universal Oil Products Company, Des Plaines, Ill., a corporation of Delaware
Continuation-in-part of application Ser. No. 686,690, Nov. 29, 1967. This application Dec. 27, 1968, Ser. No. 787,357
Int. Cl. C07c 3/52
U.S. Cl. 260—671                        10 Claims

ABSTRACT OF THE DISCLOSURE

The reaction temperature in a low temperature alkylation reaction is controlled by effecting said reaction in admixture with liquid hydrogen fluoride and carbon dioxide, and vaporizing and withdrawing a portion of the carbon dioxide to absorb the heat of reaction.

RELATED APPLICATION

This application is a continuation-in-part of my copending application Ser. No. 686,690, filed Nov. 29, 1967.

BACKGROUND OF INVENTION

This invention relates to a method for controlling the reaction temperature in a low temperature, exothermic alkylation reaction. In particular, this invention relates to a method for controlling the reaction temperature in a process for the alkylation of organic compounds in the presence of a hydrogen fluoride-carbon dioxide catalytic complex.

Production of $C_6+$ branched-paraffins having antiknock properties and suitable for use in automotive and aviation fuels is of considerable importance to the petroleum refining industry. This arises as a direct result of the introduction of high compression automobile engines requiring high anti-knock fuels to obtain maximum power. These anti-knock fuels of high octane values are typically produced by the catalytic alkylation of an iso-paraffin such as isobutane with low molecular weight olefins such as propylene, the butylenes, the amylenes or mixtures thereof.

In addition to isoparaffin-olefin alkylation, the alkylation of benzene with $C_9$–$C_{18}$ olefins is also of great commercial importance. These olefins when alkylated with benzene yield alkyl-substituted aromatic hydrocarbons suitable for conversion to surfactants such as detergents, wetting agents, etc. It is well known in the prior art that the foregoing alkylation reactions utilize catalytic materials such as essentially anhydrous hydrogen fluoride or sulfuric acid in which hydrocarbons are essentially insoluble. These processes are generally effected by contacting the alkylatable hydrocarbon with an olefin in the preence of the aforementioned catalysts in a well-agitated reaction vessel or other reaction means capable of contacting the two immiscible phases and avoiding localized concentrations of reactants. A relatively high degree of agitation is required, not only to avoid the localized concentration of reactants causing the olefins to polymerize instead of alkylate, but also to avoid localized areas of high temperature or "hot spots" within the reaction mixture which induce undesired side reactions producing inferior product and resulting in inefficient utilization of feedstock. This is particularly important in an alkylation process for the production of motor fuel such as isobutane-butene alkylation. These undesired side reactions yield products of low octane value not suitable for use in high performance engines because they possess less branching than the desired high octane branched paraffins. For example, in isobutane-butene alkylation, the more highly branched trimethylpentanes are more desirable than the less branched dimethylhexanes since they possess clear research octane ratings of 100 and higher versus about 75 for the dimethylhexanes. In addition, the higher molecular weight products of polymerization, undergo cracking, thereby yielding light mtterials also having low octane values.

In the prior art processes, effective contact between the acid catalyst phase and the hydrocarbon phase and temperature control is accomplished by various mechanical agitation devices such as atomizers, turbines, mixers, pumps, etc., with the heat of reaction typically removed by fixed, indirect heat exchange means such as heat exchangers immersed within the reaction vessel. Reaction temperature may also be controlled by the addition of precooled catalysts and/or reactants which, when mixed within the reaction, absorb heat. Often, the reactants are diluted with inert hydrocarbons such as n-butane in isobutane alkylation which provides added mass within the reactor to serve as a heat sink for the exothermic reaction. These methods of controlling the reaction in localized areas of high temperatures depend, at least in part, if not in entirety on the contact of these areas with the cooling source. In the case of a fixed heat exchanger, this means that the source requiring cooling be transferred to the heat exchanger or reactants already cooled by the heat exchanger be transferred to the high temperature spot to absorb its heat. Since this method requires time to bring the coolant and reactants in contact to absorb the heat of reaction, undesirable side reactions occur to a greater degree in the interim since, as is well known in the art, as the temperature increases, the reaction rate increases at a much greater degree.

SUMMARY OF INVENTION

Accordingly, it is an object of this invention to provide an alkylation process producing alkylate of excellent quality and to insure effective utilization of reactants by minimizing undesirable side reactions. A further object of this invention, is to provide a method for effectively removing the heat of reaction from an alkylation reaction and eliminate areas of high temperature within the reaction mass. Another object is to eliminate the necessity of the hydrocarbon diluent often utilized as a heat sink.

In an embodiment, this invention relates to a method for controlling and regulating reaction temperature in a low temperature exothermic alkylation reaction which comprises alkylating, at alkylation conditions, an alkylatable compound with an alkylating agent in admixture with liquid hydrogen fluoride and carbon dioxide, evaporating and withdrawing a portion of said carbon dioxide from the reaction mixture to absorb at least a portion of the exothermic heat of reaction. In a more limited embodiment, this invention relates to a method for controlling and regulating reaction temperature in a low temperature exothermic alkylation reaction which comprises the steps of: (a) alkylating, in an alkylation zone an alkylatable compound with an alkylating agent in admixture with liquid hydrogen fluoride and carbon dioxide at a reaction temperature below 30° C. and at a reaction pressure from about 250 p.s.i.a. to about 2,000 p.s.i.a. sufficient to maintain at least a portion of the carbon dioxide in the liquid phase; (b) lowering the pressure on said reaction zone when the reaction temperature exceeds a predetermined level, evaporating a portion of said carbon dioxide and removing the same to absorb at least a portion of the exothermic heat of reaction and to maintain the desired reaction temperature; (c) separating, from the resultant alkylation zone affluent, a liquid hydrogen fluoride-carbon dioxide stream, a liquid alkylated alkylatable compound stream containing unreacted alkylatable compound, and a gaseous carbon dioxide stream; (d) recycling at least a portion of said liquid hydrogen fluoride-carbon dioxide stream and gaseous carbon dioxide stream to said alkylation zone; (e) separating, from said liquid alkylated stream, alkylated alkylatable compound and unreacted alkylatable compound; and (f) recycling, at least a portion of said unreacted alkylatable compound to said alkylation zone. Through utilization of these embodiments the objects of this invention are accomplished. The latent heat of vaporization of the liquid carbon dioxide absorbs the alkylation heat of reaction at its source by intimate contacting of the reactants and coolants and the evolved gaseous carbon dioxide provides agitation to insure a more uniform reaction mass.

DESCRIPTION OF DRAWING

This invention can be most clearly illustrated and described by reference to the attached drawing schematically illustrating the production of high octane motor fuel alkylate by the alkylation of isobutane and butene. Of necessity, certain limitations must be present in this diagram and no intention is made thereby to limit the scope of this invention as to reactants, rates, operating conditions, catalysts, etc. Miscellaneous appurtenances including valves, controls, pumps, compressors, separators, reboilers, etc., have been eliminated where not necessary to understand this invention. Only those vessels and lines necessary for a complete and clear understanding of the embodiments of this invention are included. Various modifications to the process variables as well as the process flow can be made by those possessing expertise in petroleum technology, particularly the art of hydrocarbon alkylation.

With reference now to the accompanying drawing, butenes enter the process through line 1, being admixed with fresh isobutane entering through line 2 and recycle isobutane entering through line 3, with the resulting mixture passed via line 3 to alkylation reactor 4 fitted with mechanical agitation. Within alkylation reactor 4, the isobutane-butene mixture is admixed with liquid carbon-dioxide-hydrogen fluoride catalyst, the source of which will be hereinafter described, entering through line 22 to effect the desired alkylation reaction. The temperature of the alkylation reaction is maintained by the addition of catalyst and/or reactants existing below the reaction temperature and by evaporating a portion of the carbon dioxide. When the reaction mixture exceeds its desired temperature, this temperature reading is passed via line 5 to pressure control valve 6, causing opening of said valve and thus lowering the pressure on reaction vessel 4, said lowered pressure causing a portion of the carbon dioxide to evaporate and cool the reaction mixture. By varying the pressure in alkylation reactor 4, via valve 6, varied degrees of evaporation may be obtained depending on the degree of cooling required. When the reaction mixture returns to its desired temperature, the valve will partially close and the pressure will gradually build up within the reactor to a level determined by the vapor pressure of the reactants at the reaction temperature.

The evolved gaseous carbon dioxide leaves reactor 4 through line 7 and is combined with the liquid alkylation reactor effluent containing liquid carbon dioxide, hydrogen fluoride, isobutane and product alkylate leaving reactor 4 through line 8 and valve 9 with the resultant mixture being heat exchanged against recycle carbon dioxide and hydrogen fluoride in heat exchange vessel 10 whereafter it is passed via line 11 to settler 12 wherein liquid hydrogen fluoride-carbon dioxide are removed as a heavy inorganic phase via line 19, product alkylate and isobutane are removed as a light organic phase via line 14 and the gaseous carbon dioxide is removed via line 13.

The organic phase is passed via line 14 to stripper 15 wherein any dissolved carbon dioxide is removed and passed via line 23 to separation zone 24. Within separation zone 24 the hydrocarbons are separated by conventional fractionation techniques with $C_3$-hydrocarbons being removed via line 25, product alkylate via line 16 and unreacted isobutane for recycle via line 3.

The carbon dioxide removed from stripper 15 is commingled with the gaseous carbon dioxide from settler 12 and passed via line 16 wherein make-up carbon dioxide is added via line 17 to offset any carbon dioxide losses. The resulting carbon dioxide stream is compressed, liquefying a portion thereof in compressor 18 and passed via line 16 wherein liquid carbon dioxide and hydrogen fluoride from settler 12 is commingled to form line 20. This carbon dioxide-hydrogen fluoride mixture is cooled by heat exchange against alkylation reactor effluent in heat exchanger 10 and further cooled by indirect heat exchange with refrigerant in heat exchanger 21 to further liquefy the carbon dioxide and provide an essentially liquid carbon dioxide-hydrogen fluoride stream. This stream is combined with make-up hydrogen fluoride entering via line 22 and the resulting mixture is passed through line 22 to alkylation reactor 4, as hereinbefore described.

DESCRIPTION OF PREFERRED EMBODIMENTS

Examples of compounds which may undergo alkylation according to the method of this invention include isoparaffins such as isobutane, isopentane, isohexane, etc., normal paraffins such as n-butane, n-pentane, n-hexane, etc., aromatic hydrocarbons such as benzene, toluene, o-xylene, m-xylene, p-xylene, ethylbenzene, cumene, etc., substituted aromatic compounds such as phenol, thiophenyl, resorcinol, quinone, anisole, ethyoxy-benzene, etc.

It is also contemplated within the scope of this invention to effect the alkylation of aromatic compounds using carbohydrates as the alkylating agents. The alkylaromatic hydrocarbons which may be alkylated comprise those subject to the limitation that the alkylaromatic hydrocarbon contains adjacent unsubstituted carbon atoms. Such hydrocarbons including benzene, ethylbenzene, n-propylbenzene, isopropylbenzene, n-butylbenzene, isobutylbenzene, sec-butylbenzene, tert-butylbenzene, etc.; dialkylated aromatic hydrocarbons such as o-xylene, m-xylene, p-xylene, o-ethyltoluene, m-ethyltoluene, p-ethyltoluene, etc. and higher molecular weight dialkyl aromatic hydrocarbons sometimes referred to in the art as alkylate, including hexyltoluene, nonyltoluene, dodecyltoluene, pentade cyltoluene, etc. In addition, it is also contemplated that polyalkylated aromatic hydrocarbons may also be alkylated, said hydrocarbons including 1,2,3-trimethylbenzene, 1,2,4-trimethylbenzene, etc. Other suitable utilizable aromatic hydrocarbons include those with two or more aryl groups such as diphenyl, diphenylmethane, triphenylmethane, fluorene, stilbene, etc., as well as aromatic hydrocarbons which contain condensed benzene rings including naphthalene, anthracene, phenanthrene, crysene, etc. Examples of carbohydrates which may be utilized as alkylating agents for the aromatic compounds include aldohexoses and their di-, tri- and polyforms. Simple aldohexoses which may be used include mannose, glucose, idose, gulose, galactose, talose, allose and altrose. Utilizable aldohexose disaccharides include turanose, maltose, lactose, and trehalose. Various polysaccharides which yield aldohexoses during the reaction are also utilizable and will include starch, cellulose, dextran, etc. Other alkylating agents capable of alkylating the foregoing alkylatable compounds include mono-olefins and poly-olefins, alcohols, ethers, esters, alkyl halides, alkyl sulfates and alkyl phosphates. Preferred alkylating agents for the production of motor fuel alkylate via alkylation of isobutane are the $C_3$–$C_8$ mono-olefins or mixtures thereof. These olefins can be utilized as found in typical refinery streams as diluted with gases such as hydrogen, nitrogen, methane, ethane, etc.

The catalyst composition of the present invention comprises a hydrogen fluoride-carbon dioxide complex, said complex being formed due to the fact that hydrogen fluoride is miscible with carbon dioxide. The catalytic benefits of said catalyst complex are disclosed and described in my pending application Ser. No. 686,690, filed Nov. 29, 1967, of which the present application is a continuation-in-part. The carbon dioxide may be present in the catalyst complex in a range of from about 5 wt. percent to about 95 wt. percent of the catalyst complex. This catalyst complex may be formed by separately adding the liquid carbon dioxide to the reactor and/or by admixing it with hydrogen fluoride or other reaction components. In addition to the miscibility of the carbon dioxide with hydrogen fluoride, in some instances it has been found that a reactant which is to undergo alkylation may also be miscible, if not substantially soluble with the carbon dioxide. Thus, the carbon dioxide may be admixed with this hydrocarbon when added to the reaction. It is also preferred that the foregoing components be essentially anhydrous.

It is contemplated within the scope of this invention that the alkylation reactions which are to be effected utilizing the evaporation of carbon dioxide as a cooling method may be effected at temperatures ranging from about $-40°$ C. up to about $+30°$ C. and at pressures within the range of from about 250 p.s.i.a. to about 2,000 p.s.i.a., correlated to maintain at least a portion of the carbon dioxide in the liquid phase. The reaction conditions may not exceed a temperature of 31.0° C., the critical temperature of carbon dioxide above which carbon dioxide exists only in the gaseous phase irrespective of the pressure imposed on the system. It is preferred that the pressure imposed on the system be high enough to maintain the majority of the carbon dioxide in the liquid phase since this insures greater amounts of carbon dioxide being available for cooling.

It is further contemplated within the scope of this invention that the evaporating carbon dioxide need not be the sole cooling means within the reaction, and this invention may be used in conjunction with other methods known to the art such as indirect heat exchange within the reactor, or by adding reactants at a temperature below that of the reactor. The concept of this invention utilizing evaporating carbon dioxide as a coolant may be performed by attaching a reflux means to the reactor and continuously returning condensed carbon dioxide to the reaction as well as utilizing the hereinbefore described method of lowering the pressure on the reactor and removing the evolved gaseous carbon dioxide for condensation and cooling outside the alkylation reactor.

The advantage of using this invention as a method of cooling an alkylation reaction is readily apparent. For example, to remove 50 B.t.u. of reaction heat from a pound of reaction mixture at 0° F. not using the method of this invention would require admixing more than 8 pounds of reaction components cooled to $-10°$ F. to maintain the 0° F. temperature while, if utilizing the concept of this invention, the same 0° F. temperature may be maintained by evaporating about 0.4 pound of carbon dioxide. Thus, this invention lowers the amount of reactants required to be circulated to maintain a given reaction temperature and the evolved gaseous carbon dioxide acts as an agitator to keep the reaction medium uniform.

In a specific example, 1376 pounds per hour of a mixed hydrocarbon feedstock cooled to $-10°$ C. and possessing the following weight composition: 10.9% 1-butene; 88.2% isobutane; 0.8% butane and 0.1% propane is fed to an agitated alkylation reactor maintained initially at 0° C. and 750 p.s.i.a. In addition 2419 pounds per hour of a 3/1 carbon dioxide to hydrogen fluoride (weight ratio) liquid catalyst complex is fed to the reactor. The resultant reaction mixture is passed through the reactor maintaining a 10 minute residence time with the reactor pressure lowered whenever the reaction mixture exceeds 2° C. to evaporate the liquid carbon dioxide and absorb the heat of reaction, thus maintaining a reaction temperature within 2° C. of 0° C. The reactor pressure is never lowered to a pressure sufficient to evaporate the hydrogen fluoride and the hydrocarbon reactants. Recovered from the resultant reaction effluent is 926 pounds per hour of gaseous carbon dioxide, 1545 pounds per hour of liquid alkylation catalyst containing 3.1 weight percent isobutane, 60.1 weight percent hydrogen fluoride and 36.8 weight percent carbon dioxide, and 292 pounds per hour of deisobutanized alkylate possessing an 88.2 Research Clear octane number.

I claim as my invention:

1. A method for controlling and regulating reaction temperature in a low temperature exothermic alkylation reaction which comprises alkylating, at alkylation conditions, an alkylatable compound with an alkylating agent in admixture with liquid hydrogen fluoride and carbon dioxide, evaporating and withdrawing a portion of said carbon dioxide from the reaction mixture to absorb at least a portion of the exothermic heat of reaction.

2. The method of claim 1 further characterized in that said alkylation conditions include temperatures from about $-40°$ C. to about $+30°$ C. and pressures from about 250 p.s.i.a. to about 2,000 p.s.i.a.

3. The method of claim 2 further characterized in that said alkylatable compound is isobutane and said alkylating agent is a butene.

4. The method of claim 2 further characterized in that said alkylatable compound is isobutane and said alkylating agent is propylene.

5. The method of claim 2 further characterized in that said alkylatable compound is isobutane and said alkylating agent is propylene and butene.

6. A method for controlling and regulating reaction temperature in a low temperature exothermic alkylation reaction which comprises the steps of:
   (a) alkylating, in an alkylation zone, an alkylatable compound with an alkylating agent in admixture with liquid hydrogen fluoride and carbon dioxide at a reaction temperature below 30° C. and at a reaction pressure from about 250 p.s.i.a. to about 2,000 p.s.i.a. sufficient to maintain at least a portion of the carbon dioxide in the liquid phase;
   (b) lowering the pressure on said reaction zone, when the reaction temperature exceeds a predetermined level, evaporating a portion of said carbon dioxide and withdrawing the same to absorb at least a portion of the exothermic heat of reaction and to maintain the desired reaction temperature;
   (c) separating, from the resultant alkylation zone effluent, a liquid hydrogen fluoride-carbon dioxide stream, a liquid alkylated alkylatable compound stream containing unreacted alkylatable compound, and a gaseous carbon dioxide stream;
   (d) recycling at least a portion of said liquid hydrogen fluoride-carbon dioxide stream and said gaseous carbon dioxide stream to said alkylation zone;
   (e) separating, from said liquid alkylated stream, alkylated alkylatable compound and unreacted alkylatable compound; and
   (f) recycling, at least a portion of said unreacted alkylatable compound to said alkylation zone.

7. The method of claim 6 further characterized in that said alkalatable compound is isobutane and said alkylating agent is a butene.

8. The method of claim 6 further characterized in that said alkalatable compound is isobutane and said alkylating agent is propylene.

9. The method of claim 6 further characterized in that said alklatable compound is isobutane and said alkylating agent is propylene and a butene.

10. The method of claim 6 further characterized in that said alkylatable compound is benezene and said alkylating agent is a $C_9$-$C_{18}$ mono-olefin.

References Cited

UNITED STATES PATENTS

| | | | |
|---|---|---|---|
| 2,437,544 | 3/1948 | Marisic | 260—683.51 XR |
| 2,908,729 | 10/1959 | McCaulay | 260—671 |
| 3,372,207 | 3/1968 | Hutson | 260—671 |
| 3,408,419 | 10/1968 | Herber et al. | 260—683.51 |

DELBERT E. GANTZ, Primary Examiner

C. R. DAVIS, Assistant Examiner

U.S. Cl. X.R.

260—683.51